United States Patent [19]

Bodson

[11] 4,096,233

[45] Jun. 20, 1978

[54] PROCESS FOR THE REMOVAL OF IMPURITIES CONTAINED IN A ZINC AND CADMIUM SULFATE SOLUTION

[75] Inventor: Fernand Jacques Joseph Bodson, Angleur, Belgium

[73] Assignee: Societe des Mines et Fonderies de Zinc de la Vieille Montagne, S.A., Angleur, Belgium

[21] Appl. No.: 693,620

[22] Filed: Jun. 7, 1976

[30] Foreign Application Priority Data

Jun. 19, 1975 Belgium .................................. 830450

[51] Int. Cl.$^2$ ........................ C01G 9/06; C01G 11/00
[52] U.S. Cl. .................................. 423/101; 423/140; 423/544; 204/DIG. 13
[58] Field of Search .................. 423/99, 101, 104, 140, 423/147, 544, 500, 502; 204/114, 119, DIG. 13

[56] References Cited

U.S. PATENT DOCUMENTS

| 570,624 | 11/1896 | Donald | 423/500 |
| 1,283,077 | 10/1918 | Clevenger | 423/101 |
| 1,973,300 | 9/1934 | Thompson | 423/101 |
| 2,145,816 | 1/1939 | Stoops | 423/104 |
| 2,746,840 | 5/1956 | Davis | 423/103 |
| 2,772,230 | 8/1956 | Hollander | 423/104 |
| 2,977,221 | 3/1961 | Howling et al. | 423/140 |
| 3,269,831 | 8/1966 | Wilson | 423/104 |
| 3,600,128 | 8/1971 | Schulze | 423/101 |

FOREIGN PATENT DOCUMENTS

| 131,998 | 9/1919 | United Kingdom | 423/544 |
| 370,965 | 4/1932 | United Kingdom | 423/544 |

*Primary Examiner*—O. R. Vertiz
*Assistant Examiner*—Gary P. Straub
*Attorney, Agent, or Firm*—Sughrue, Rothwell, Mion, Zinn and Macpeak

[57] ABSTRACT

Process for removing impurities selected from the group consisting of manganese, cobalt, nickel and thallium from an acidic zinc or cadmium solution comprising adding thereto acid of Caro or an ammonium or alkali metal salt thereof.

3 Claims, No Drawings

PROCESS FOR THE REMOVAL OF IMPURITIES CONTAINED IN A ZINC AND CADMIUM SULFATE SOLUTION

SUBJECT-MATTER OF THE INVENTION

The present invention concerns a process for removing impurities from a zinc sulphate solution or from a cadmium sulphate solution, and more particularly a process for removing chlorine, manganese, cobalt, nickel and thallium from sulphate solutions for the production of electrolytic zinc or electrolytic cadmium.

THE PRIOR ART

At present it is known to remove chlorine by adding a silver salt to the solution; thus a precipitate of silver chloride is obtained which is separated by filtration. This way of proceeding is little economical due to the cost of the silver salt, a part of which is lost during the operations.

As to the manganese, it is known that it may be removed by precipitating the zinc contained in the solution by means of a base such as $Ca(OH)_2$, which leaves the manganese dissolved and forms a precipitte of calcium sulphate and basic zinc sulphate which is dissolved again by means of sulphuric acid. This process is complicated and expensive both with respect to the investment as to the working expenses.

Moreover it is usually not possible to allow the manganese content of a zinc or cadmium sulphate solution to increase to more than one tenth of the zinc or cadmium content; thus, if the zinc content of the solution is 150g/l, the manganese content may not exceed 15 g/l, which means that to remove 1 kg of manganese, one has to precipitate 10 kg of zinc.

To remove the cobalt and the nickel it is at present known to add zinc dust to the solution. This process is expensive as it necessitates a very important excess of zinc dust and catalysts, and as one has to heat the solution to about 90° C; this process becomes unusable when the cobalt and nickel contents exceed 50 mg/l. As moreover the cobalt and nickel cement which is obtained contains also cadmium, and when this is again dissolved, one also dissolves nickel and cobalt, so that reintroducing the solution into the circuit after separation of the cadmium increases the nickel and cobalt contents thereof, it is sometimes necessary to remove these two elements, which requires an enormous excess of zinc dust which is lost and cannot be recuperated.

The thallium may be removed as a thallo-chromate precipitate, by using sodium chromate; in that case the sodium ions remain dissolved and may become trouble some due to their accumulation.

There is also known a method which provides adding potassium permanganate to the zinc or cadmium sulphate solution. This method, which enables to remove the various elements Mn, Co, Ni, Tl and Cl, has however the drawback that it introduces K ions into the solution; besides, the method offers no selectivity at all, all elements being removed at the same time; this is inconvenient especially when one wishes to keep some manganese in the solution in order to protect the lead anodes by means of a $MnO_2$ precipitate during the electrolysis.

BRIEF DESCRIPTION OF THE INVENTION

The present invention, which aims to remove the abovestated drawbacks of the known processes, concerns a process for removing impurities from a sulphate solution of the zinc and cadmium group, which process comprises adding to said solution persulphuric acid which has been hydrolysed, preferably the so called acid of Caro, whereby the various elements Cl, Mn, Tl, Co and Ni may be removed selectively. The acidity of the sulphate solution is preferably comprised between 15 g sulphuric acid per liter and a pH of 5.5.

DETAILED DESCRIPTION OF THE INVENTION

Throughout the present specification the expression "persulphuric acid" comprises this acid in itself or its derivatives, alone or in admixture, such as they result in particular from a more or less lasting hydrolysis of said acid; thus, said expression is intended to include persulphuric acid $H_2S_2O_8$ or any salt thereof, such as $Na_2S_2O_8$, $K_2S_2O_8$, $(NH_4)_2S_2O_8$; the acid of Caro $H_2SO_5$ or any salt thereof such as $Na_2SO_5$, $K_2SO_5$, $(NH_4)_2SO_5$; hydrogen peroxide; or a mixture of these various products.

It is known that persulphuric acid $H_2S_2O_8$ is obtained by anodic oxidation of sulphuric acid on platinum anodes using a high stream density. This persulphuric acid hydrolyses progressively according to the following reactions:

$$H_2S_2O_8 + H_2O \rightarrow H_2SO_5 + H_2SO_4$$

$$H_2SO_5 + H_2O \rightarrow H_2O_2 + H_2SO_4$$

Therefore it is almost impossible to keep pure persulphuric acid in general one has a mixture of the three components: $H_2S_2O_8$, $H_2SO_5$ and $H_2O_2$.

In a solution of persulphuric acid, the amounts of each of these three components have been determined after various hydrolysis times at a temperature of 22° C. The results of these analyses are represented in the following table 1.

TABLE 1

| Hydrolysis time | $H_2S_2O_4$ mole/l | $H_2SO_5$ mole/l | $H_2O_2$ mole/l |
|---|---|---|---|
| 0 | 1,45 | 0,00 | 0,00 |
| 10 min. | 1,27 | 0,18 | 0,00 |
| 30 min. | 1,10 | 0,35 | 0,00 |
| 1 h | 0,96 | 0,51 | 0,00 |
| 1 h 30 | 0,81 | 0,71 | 0,00 |
| 2 h | 0,64 | 0,87 | 0,010 |
| 3 h | 0,37 | 1,07 | 0,015 |
| 5 h | 0,15 | 1,30 | 0,030 |
| 6 h | 0,095 | 1,35 | 0,040 |
| 7 h | 0,05 | 1,37 | 0,050 |
| 10 h | 0,015 | 1,39 | 0,080 |
| 25 h | 0,00 | 1,23 | 0,20 |

Another method for producing the acid of Caro consists in reacting oleum with hydrogen peroxide at lower temperature; thus, when mixing hydrogen peroxide having a $H_2O_2$ content of 70%, with oleum containing 25 weight percent of $SO_3$, in a molar ratio of total $SO_3$: $H_2O_2$ comprised between 1, 8 and 2, one obtains a final product having the following composition by weight: $H_2SO_5$: 43% ; $H_2O_2$: 1% ; $H_2S_2O_8$: 1, 6% ; $H_2SO_4$: 44% and $H_2O$ = rest.

It appears that also in this case a mixture of $H_2SO_5$, $H_2O_2$ and $H_2S_2O_8$ is obtained having a maximum $H_2SO_5$ content. When such a mixture of the three components $H_2S_2O_8$, $H_2SO_5$ and $H_2O_2$ is added to a zinc or cadmium sulphate solution containing Cl, Mn, Ni, Co and Tl ions, these elements are oxidized to a removable form.

With the Cl, the following reactions take place:

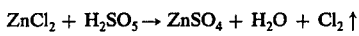

The produced chlorine is gaseous and may easily be removed by blowing air through the solution.

By the $H_2S_2O_8$ acid, the other elements are oxidized into an insoluble form, according to the following table:

TABLE 2

| Before oxidation | After oxidation | |
|---|---|---|
| | in the solution | precipitated |
| $Mn^{2+}$ | $Mn^{4+}$ | $Mn(OH)_4$ |
| $Ni^{2+}$ | $Ni^{3+}$ | $Ni_2O_3$ |
| $Co^{2+}$ | $Co^{3+}$ | $Co(OH)_3$ |
| $Tl^{+}$ | $Tl^{3+}$ | $Tl(OH)_3$ |

It has been found that the chlorine is removed along or in a selective way, thats to say without the other elements, if the reaction is performed in an acid solution, such as for instance a solution issuing from the electrolysis of the zinc or the cadmium; in that case one simply adds the persulphuric acid or one of its derivatives to the solution.

In order to favour the removing of the chlorine, there is used according to one feature of the present invention, a solution which is free of manganese (IV) salts. As an exhausted acid solution of zinc or cadmium leaving an electrolysis cell always contains manganese IV salts, according to another feature of the invention there is added to said solution a reducing agent such as an iron (II) salt, preferable iron (II) sulphate, in an amount which is sufficient to discolour the solution; this amount is usually comprised between 100 and 200 mg/l.

According to another feature of the invention, there is used persulphuric acid which has been hydrolysed a certain time; tests have shown that a hydrolysis of 10 to 14 hours, at a temperature of 20°C, provides the optimal contents of acid of Caro.

In each of the examples hereafter, when it is mentioned that a stoichiometrical amount of persulphuric acid is used for the oxidation of one or more of the elements Cl, Ni, Co, Tl and Mn, it is understood that the total amount of the oxidation agents contained in the persulphuric acid, namely $H_2S_2O_8$, $H_2SO_5$ and $H_2O_2$, partakes to the oxidation reaction and that the considered elements go over to their oxidation state indicated in table 2 hereabove.

EXAMPLE 1

Test 1

To an acid solution of zinc sulphate issuing from an electrolysis cell, and containing: Zn : 50 g/l ; $H_2SO_4$ : 170 g/l ; Cl : 495 mg/l 145 mg/l iron (II) sulphate were added in order to reduce the manganese (IV) salts, which is visible the discolouring of the solution. To the solution heated to 40° C, the stoichiometric amount of freshly prepared persulphuric acid needed for removing the chloride ions, was added at one time, and the formed chlorine was released by blowing air through the solution.

The chloride content of the treated solution varied with the reaction time as it appears from the following table: The starting solution contained 495 mg chloride per liter;

then, after 1 hour: 300 mg/l
2 hours: 240 mg/l
3 hours: 210 mg/l
4 hours: 175 mg/l
5 hours: 170 mg/l After 5 hours, the chlorine was removed to an extend of 66%.

Test 2

Using the same solution as in test 1, $H_2S_2O_8$ was added thereto as in said test 1, however without having previously reduced the manganese (IV) salts.

The chloride contents varied with the reaction time in the following way: The starting solution contained 495 mg/l chlorine;

then, after 1 hour: 375 mg/l
2 hours: 372 mg/l
3 hours: 370 mg/l
4 hours: 364 mg/l
5 hours: 362 mg/l In this case one observes that after 5 hours only 27% of the chlorine was removed.

When comparing these two tests of example 1, one clearly sees that the previous reduction of the manganese (IV) salts favours the removing of the chloride ions.

EXAMPLE 2

To an acid zinc sulphate solution, issuing from zinc electrolysis cells, which solution contained: Zn : 52 g/l ; $H_24$ : 169 g/l ; Cl : 700 mg/l 125 mg/l iron (II) sulphate were added in order to reduce the manganese (IV) salts.

To this discoloured solution were added at one time:
in a first test the stoichiometric amount of freshly prepared $H_2S_2O_8$ needed for removing the chlorides;
in a second test, the same amount of $H_2S_2O_8$ which had been hydrolysed during 10 hours;
in a third test, the same amount of $H_2S_2O_8$ which had been hydrolysed during 42 hours at 10° C.

The chloride contents were determined after various reaction times of the $H_2S_2O_8$, for each of the three tests. The results are represented in table 3 below:

TABLE 3

| Test | 1 Freshly prepared $H_2S_2O_8$ | 2 $H_2S_2O_8$ hydrolysed during 10 h at 12° C | 3 $H_2S_2O_8$ hydrolysed during 42 h at 12° C |
|---|---|---|---|
| Chloride contents | | | |
| at the starting | 700 mg/l | 700 mg/l | 700 mg/l |
| after 1 hour | 452 | 295 | 400 |
| after 2 hours | 400 | 238 | 295 |
| after 3 hours | 350 | 212 | 275 |
| after 4 hours | 312 | 175 | 252 |
| after 5 hours | 270 | 165 | 252 |
| Removement of the Cl after 5 hours | 61,43% | 76,43% | 64% |

From these results, it appears that the removement of the chloride ions is at its maximum when the $H_2S_2O_8$ has been submitted to a duration of hydrolysis corresponding to obtaining the maximum content of acid of Caro.

It has been observed that in order to remove the Mn it is most convenient to use a solution of persulphuric acid whose content of acid of Caro is as high as possible; as to the pH, it shoudl be comprised between 2 and 5.5; although it is possible to work at the temperature of the sulphate solution of the circuit, it has been found that the filtration of the obtained precipitate is faster when the temperature is higher.

EXAMPLE 3

Test 1

To a zinc sulphate solution, heated to 50° C and containing Zn : 140 g/l ; Mn : 10 g/l, the stoichiometric amount of a freshly prepared persulphuric acid solution, containing $H_2SO_5$ : 26,5 g/l ; $H_2S_2O_8$ : 307,5 g/l , $H_2O_2$ : 0 g/l, which is needed to oxidise the manganese to the IV-oxidation level, was added over a time of half one hour, whereby the pH of the solution was maintained at a value of 4.5 by adding ZnO, and the temperature was maintained at 50° C.

After this addition, the manganese content was of 8 g/l. During the 3 following hours, the Mn content oscillated between 7.8 g/l and 8.2 g/l according to the accuracy of the samples and of the analyses, so that the Mn-precipitation reached from 18% to 22%.

Test 2

In this test one proceeded as in test 1 with a zinc sulphate solution, using persulphuric acid hydrolysed during 12 hours at 15° C and containing $H_2SO_5$: 175 g/l ; $H_2S_2O_8$ < 1,5 g/l ; $H_2O_2$ about 1,5 g/l, thereby maintaining the temperature at 50° C and the pH at 4.5 by addition of ZnO.

After the addition, the Mn-content was 0.5 g/l, and thereafter it still decreased to 0.39 g/l during the following 3 hours, so that the Mn precipitation reached 95%.

Test 3

One proceeded with a zinc sulphate solution in the same way as in tests 1 and 2, using $H_2S_2O_8$ which had been hydrolysed during 5 days at a temperature comprised between 20 and 22° C and containing $H_2S_2O_8$ < 0.1 g/l ; $H_2SO_5$ : 60 g/l ; $H_2O_2$ : 28.3 g/l.

After the addition, which took place in half one hour, the Mn content was 8.7 g/l and thereafter it still increased to reach 9.6 g/l after 3 hours.

The precipitation of the Mn was lower than 5%.

The three tests of example 3 show clearly the advantage of adding to the zinc sulphate solution to be treated a solution of persulphuric acid in which the content of the acid of Caro $H_2SO_5$ is as high as possible and the $H_2O_2$ content is as low as possible, as the $H_2O_2$ causes the redissolution of the $Mn(OH)_4$ precipitate.

EXAMPLE 4

Test 1

To a zinc sulphate solution containing: Zn : 140 g/l ; Mn : 10 g/l ; Co : 13,9 mg/l ; Ni : 9,5 mg/l ; Cl : 909 mg/l, the stoichiometric amount of a hydrolysed $H_2S_2O_8$ solution, needed for oxidizing $Mn^{2+}$ to $Mn^{4+}$ and which had $H_2S_2O_8$ and $H_2O_2$ contents lower than 1.5 g/l, whereas its $H_2SO_5$ content was 290 g/l, was added over a time of 30 minutes, thereby maintaining the pH to 4.5 by adding ZnO.

After the addition of the $H_2S_2O_8$ solution the Mn content was 0.315 g/l and it still decreased to 0.16 g/l, which corresponds to a precipitation of 95% of the Mn.

The final Co, Ni and Cl contents were respectively: 5.75 mg/l ; 3.55 mg/l and 750 mg/l.

Test 2

One proceeded as in test 1 hereabove, but the pH was maintained at a value of 3 during the test, by addition of ZnO. After the addition of the $H_2S_2O_8$ solution, the Mn content was 0.95 g/l and after 3 hours it was 0.94 g/l. The precipitation of the manganese reached 90.5%. The final Co, Ni and Cl contents were respectively : 4.25 mg/l; 2.80 mg/l and 785 mg/l.

Test 3

One also proceeded as in test 1 hereabove, maintaining however the pH at a value of 1.5 during the test by addition of ZnO. After the addition of the $H_2S_2O_8$, the Mn content was 2.7 g/l and after 3 hours of reaction, it still had the same value. The precipitation of the Mn amounted therefore to 73%. The co, Ni and Cl contents were respectively : 2 mg/l; 2.3 mg/l and 720 mg/l.

The three tests of example 4 show that the precipitation of the manganese is more important when the treated solution has a high pH value. With respect to the Co and Ni one observes that their removing is rather stable and even somewhat better when the treated solution has a lower pH value.

EXAMPLE 5

To a solution of cadmium sulphate, heated to 50° C, containing Cd: 170 g/l; Tl : 2.3 g/l ; Co : 82.5 mg/l ; Ni : 755 mg/l ; Mn : 4.9 g/l and Cl : 178 mg/l, the stoichiometric amount of persulphuric acid hydrolysed during 12 hours at 20° C, which is needed to oxidize the Mn from $Mn^{2+}$ to $Mn^{4+}$, the Co from $Co^{2+}$ to $Co^{3+}$, the Ni from $Ni^{2+}$ to $Ni^{3+}$ and the Tl from $Tl^{+}$ to $Tl^{3+}$, was added at one time, thereby maintaining the pH during the whole test at a value comprised between 4 and 4.5, by addition of calcium carbonate.

One hour after the addition of the perulphuric acid, their contents in the solution were respectively: Tl : 48 mg/l; mg/Co : 15 mg/l; Ni : 110 mg/l ; Mn : 10 mg/l and Cl : 150 mg/l.

It appears thus that the various elements were removed respectively to the following extends: Tl : 97.91%; Co : 81.22%; Ni : 85.43%; Mn : 99.80 %; Cl : 15.73%.

In conclusion one observes that it is possible to remove simultaneously the Mn, the Co, the Ni and the Tl.

I claim:

1. A process for the substantial removal of the impurities manganese, cobalt and nickel from a zinc or cadmium sulfate solution which comprises substantially simultaneously precipitating said impurities by adding to said zinc or cadmium sulfate solution a member selected from the group consisting of a solution of $H_2S_2O_8$, an ammonium or an alkali metal salt thereof, which has been hydrolyzed to provide the maximum content of $H_2SO_5$, the ammonium or an alkali metal salt thereof, while maintaining the pH of said zinc or cadmium sulfate solution between 1.5 and 4.5.

2. A process according to claim 1, wherein said impurities further include thallium, which is precipitated along with said manganese, cobalt and nickel while maintaining the pH of the solution between 4 and 4.5.

3. A process according to claim 1, wherein the solution of $H_2S_2O_8$ is hydrolyzed during a time of between 10 and 14 hours at a temperature of 20° C.

* * * * *